United States Patent Office 2,977,391
Patented Mar. 28, 1961

2,977,391

BETA-ETHOXYETHYLDECABORANE AND METHOD FOR ITS MANUFACTURE

Carl E. Pearl, Azusa, Calif., assignor, by mesne assignments, to Thiokol Chemical Corporation, a corporation of Delaware No Drawing. Filed Jan. 15, 1957, Ser. No. 634,391

9 Claims. (Cl. 260—606.5)

This invention relates to a new composition of matter, beta-ethoxyethyldecaborane, and to a method for its preparation.

The new composition of this invention is a liquid of the formula $B_{10}H_{13}$—$CH(CH_3)$—$OC_2H_5$ and boils within the approximate range 80° C. to 109° C. at an absolute pressure of 0.9 mm. of mercury. Beta-ethoxyethyldecaborane is used as a chemical intermediate in the preparation of a variety of compounds containing boron, carbon and hydrogen. It is also useful as a high energy fuel for gas turbine engines, and can be admixed with conventional jet fuels such as JP-4 in proportions of, for example, 10–20 percent by volume, in order to increase their heats of combustion.

The process by which this compound is prepared consists of a Friedel-Crafts catalyzed reaction between decaborane and vinyl ethyl ether at a temperature ranging from −30° C. to 170° C., the reaction preferably being conducted with the reactants dissolved in a suitable inert solvent. The resultant reaction involves addition of hydrogen from the decaborane to one of the doubly bonded carbon atoms in the vinyl ethyl ether, and the addition of the decaborane residue to the other doubly bonded carbon atom.

The method of preparation of the new composition is more fully illustrated by the following examples:

Example I

To a mixture of 15.0 g. (0.123 mole) of decaborane, 24.0 g. (0.176 mole) of zinc chloride and 300 ml. of n-heptane, stirred at the reflux temperature of 98° C., there was added over a period of 45 minutes 45.0 g. (0.625 mole) of vinyl ethyl ether dissolved in 50 ml. of heptane. This was followed by stirring and refluxing for an additional 60 minutes. Distillation of the supernatant heptane solution resulted in 7.7 g. of recovered free decaborane and 3.1 g. of light yellow liquid (B.P. 80° C.–109° C./0.9 mm. of mercury). An appreciable quantity of black, non-volatile residue was recovered during the distillation of the heptane-soluble material. Infrared inspection of the liquid product showed it to be beta-ethoxyethyldecaborane.

Example II 0.123 gram moles of decaborane, 0.120 gram moles of zinc chloride and 300 ml. of carbon bisulfide were refluxed at 25° C. for approximately ten minutes. To this mixture was added 0.325 gram moles of vinyl ethyl ether dissolved in 50 ml. of carbon bisulfide. This addition was made over a period of 45 minutes, and was followed by stirring and refluxing for an additional 24 hours and 15 minutes. 9.89 g. of unreacted decaborane and 1.7 g. of light yellow liquid (B.P. 80° C.–109° C./0.9 mm. of mercury) were recovered by the distillation of the supernatant carbon bisulfide solution. The yield of beta-ethoxyethyldecaborane was lowered in this case due to a spontaneous decomposition which occurred during distillation. Infrared inspection of the liquid product showed it to be beta-ethoxyethyldecaborane.

Example III

To a mixture of 0.123 gram moles of decaborane, 0.06 gram moles of zinc chloride and 300 ml. of heptane stirred at reflux temperature there was added 0.188 gram moles of vinyl ethyl ether dissolved in 50 ml. of heptane. This was added over a period of 45 minutes and was followed by stirring and reflux at 98° C. for an additional 90 minutes. The supernatant heptane solution was distilled and resulted in a recovery of 14.1 g. of unreacted decaborane and 3.1 g. of light yellow beta-ethoxyethyldecaborane (B.P. 80° C.–109° C./0.9 mm. of mercury). Infrared inspection of the liquid product showed it to be beta-ethoxyethyldecaborane.

Various modifications can be made in the procedures of the specific examples to provide other embodiments falling within the scope of this invention. In general, however, the relative molar proportions of vinyl ethyl ether and decaborane introduced into the reaction zone will be within the range 0.2 to 12, the range being expressed in terms of moles of vinyl ethyl ether to moles of decaborane. Also, if desired, in place of the vinyl ether there can be utilized an equimolar amount of a different vinyl lower alkyl ether containing from 1 to 5 carbon atoms in the alkyl radical, for example, vinyl methyl ether, vinyl n-propyl ether, vinyl isopropyl ether, vinyl n-butyl ether and the like, or mixtures thereof. The reaction is conducted while the reaction mixture contains a catalytic amount of a Friedel-Crafts catalyst. In the specific examples, zinc chloride was utilized. In its place, however, there can also be employed other Friedel-Crafts catalysts, such as zinc bromide, ferric chloride, ferric bromide, aluminum chloride, aluminum bromide, stannic chloride, and the like. Concentrated hydrochloric acid, concentrated hydrobromic acid and concentrated hydrofluoric acid can also be employed as the catalyst in carrying out the reaction between the decaborane and the vinyl alkyl ether, such as vinyl ethyl ether. The amount of catalyst utilized can be varied in amount from a trace, such as 0.01 mole per mole of decaborane, to a considerable amount, such as 3 moles per mole of decaborane or even more. The reaction time can be varied widely, for example, from ½ to 50 hours, and likewise the reaction pressure can be varied widely, from subatmospheric pressure to 10 atmospheres pressure or somewhat more. Advantageously, however, the reaction is conducted at substantially atmospheric pressure, as was done in the specific examples.

Although the reaction between the decaborane and vinyl alkyl ether can be conducted in the absence of an inert solvent, it is preferably conducted in the presence of an inert solvent in the amount of from approximately 80 percent to 97 percent by weight, based upon the total weight of the reaction mixture, such weight including the weight of the solvent, Friedel-Crafts catalyst, decaborane and vinyl alkyl ether. In the specific examples, heptane, carbon bisulfide and diethyl ether were employed as the reaction solvent, but in their place there can be substituted any of a wide variety of other materials, such as paraffin hydrocarbons containing from 4 to 10 carbon atoms, for example, n-butane, n-pentane, isopentane, n-hexane, n-octane, 2,2,4-trimethylpentane, cyclopentane, methylcyclopentane, cyclohexane, methylcyclohexane and so forth. Lower dialkyl ethers containing from 1 to 5 carbon atoms in each alkyl radical can also be utilized as a solvent, for example, dimethyl ether, methylethyl ether, methyl-n-propyl ether, di-n-propyl ether, di-isopropyl ether, methyl-n-butyl ether and so forth.

The compositions of this invention can be employed as fuel when burned with air. Thus, it can be used as a fuel in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The product of our invention is particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level condition to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The product of this invention is well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon rather than the composition of the present invention. Excess air is introduced into the combustor for dilution purposes so that the resultant gas at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in an overall ratio of approximately 0.012 to 0.020 for hydrocarbons before entrance into the turbine section. For the high energy fuels of the present invention, the local fuel to air ratio in the zone of fuel injection should also be approximately stoichiometric assuming that the boron, carbon and hydrogen present in the product burn to boric oxide, carbon dioxide and vapor (water). In the case of the beta-ethoxyethyldecaborane, for example, this local fuel to air ratio by weight is approximately 0.082. For the higher energy fuels of the present invention, because of their higher heating value in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the product of the present invention is employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The product of this invention can also be employed as aircraft gas turbine fuel in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of its high chemical reactivity and heating value, the composition of this invention can be employed as a fuel in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operation with conventional aircraft fuels.

The burning characteristics of the product of this invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the product of this invention eliminates the need of flameholding devices within the combustion zone of the afterburner. When employed in an afterburner, the fuel of our invention is simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The composition of this invention will improve the combustion process of the ramjet in much the same manner as that described for the afterburner because of its improved chemical reactivity over that of simple hydrocarbon fuels. When employed in a ramjet the fuel of this invention will be simply substituted for hydrocarbon fuels and used in the established manner.

It is claimed:
1. Beta-ethoxyethyldecaborane of the formula $$B_{10}H_{13}-CH(CH_3)-OC_2H_5$$

being a liquid boiling within the approximate range 80° C. to 109° C. at an absolute pressure of 0.9 mm. of mercury.

2. A method for the production of beta-ethoxyethyldecaborane which comprises reacting one mole of decaborane and from 0.2 to 12 moles of vinyl ethyl ether at a temperature within the range from −30° C. to 170° C. while the reactants are in admixture with a catalytic amount of a Friedel-Crafts catalyst.

3. The method of claim 2 wherein the Friedel-Crafts catalyst is zinc chloride.

4. A method for the production of beta-ethoxyethyl-decaborane which comprises reacting one mole of decaborane and from 0.2 to 12 moles of vinyl ethyl ether at a temperature within the range from −30° C. to 170° C. while the reactants are in admixture with a catalytic amount of from 0.01 to 3 moles of a Friedel-Crafts catalyst per mole of decaborane.

5. The method of claim 4 wherein the Friedel-Crafts catalyst is zinc chloride.

6. The method of claim 5 wherein the reaction mixture contains from 80 percent to 97 percent by weight of a solvent which is inert under the reaction conditions.

7. The method of claim 6 wherein the inert solvent is n-heptane.

8. The method of claim 6 wherein the inert solvent is carbon bisulfide.

9. The method of claim 6 wherein the inert solvent is diethyl ether.

No references cited.